Dec. 13, 1960 R. D. HULL 2,964,257
HEAVY DUTY SPINNING REEL
Filed Aug. 7, 1956 3 Sheets-Sheet 1

R. Dell Hull
INVENTOR.

BY
Pennie, Edmonds, Morton, Barrows & Taylor
ATTORNEYS

R. Dell Hull
INVENTOR.

BY
Rennie, Edmonds, Morton, Barrows & Taylor
ATTORNEYS

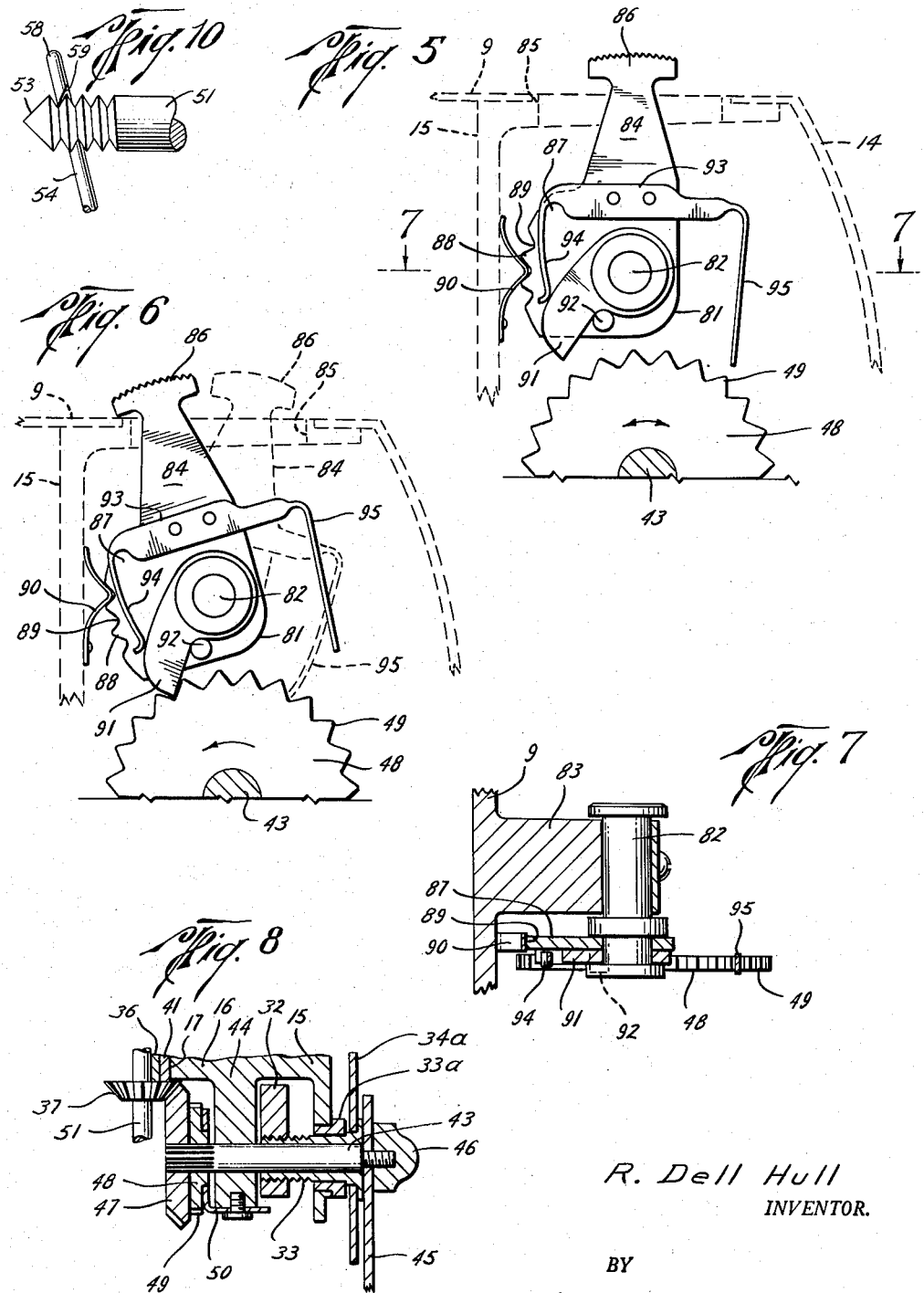

United States Patent Office 2,964,257
Patented Dec. 13, 1960

2,964,257

HEAVY DUTY SPINNING REEL

R. Dell Hull, 2615 E. Oklahoma Place, Tulsa, Okla.

Filed Aug. 7, 1956, Ser. No. 602,566

8 Claims. (Cl. 242—84.51)

This invention relates to fishing reels of the spinning type and particularly to improvements in reels of the type disclosed in my co-pending application, Serial No. 459,943, filed October 4, 1954, now Patent No. 2,915,258.

A primary object of the present invention is to provide a spinning reel adapted particularly for heavy duty service in fishing for relatively large sized fish where ruggedness of construction and means for maintaining full control at all times of the line and the line spooling mechanism are primary requisites.

The present invention embodies, as one improvement over the structure disclosed in my aforementioned application, an assembly of elements, which is herein termed a "spooling control unit," which includes a single lever element, selectively movable to three different positions, in one of which the line pick-up head is locked against reverse rotation during reeling-in or re-winding of the line, in another of which the pick-up head is free to rotate in either direction, and in a third position in which a click member is actuated for operation during both forward or reverse rotation of the pick-up head, the lever being positioned for convenient access by the operator to permit easy and quick movement between the several positions.

Among the other features of construction constituting the present invention are improvements in the line-braking mechanism and actuating elements therefor; in the mechanism for advancing and retracting the line pick-up finger; in the slipping clutch or "drag" mechanism for the line spool; and in the combinations of these several elements with the spooling control unit and with the other elements of the reel.

By virtue of the improved construction, reels constructed in accordance with the present invention are particularly adapted for heavy duty service, such as surf fishing for large fish, and are substantially improved over more conventional reels in that they are much more efficient and much faster and smoother in operation, and have less drag, thereby enabling the casting of comparatively light lures for long distances and with a maximum degree of control of the line during casting and re-winding.

Additional advantages of construction, in accordance with the present invention, are that minimum adjustments are necessary, the reel fits any conventional fishing rod and handles and is operated by ordinary movements employed in operating more conventional types of fishing reels. In particular, although the reel, in accordance with the present invention, is a true spinning reel, the construction permits its operation in handling in a manner substantially identical with conventional casting reels. Moreover, the danger of back-lash is completely eliminated and relatively long, effortless casts, particularly of light lures, as noted, may be obtained.

Other and more specific objects and advantages of the present invention will become readily apparent from the following detailed description when read in conjunction with the accompanying drawing which illustrates one useful embodiment in accordance with this invention.

In the drawing:

Fig. 5 is a fragmentary elevational view, partly in section, taken along line 5—5 of Fig. 2, showing the parts of the spooling control unit in the neutral position;

Fig. 6 is a view similar to Fig. 5, showing, in full lines, the parts of the spooling control unit in anti-reverse position, and in broken lines the parts in the click-engaging position;

Fig. 7 is a cross-sectional view taken along line 7—7 of Fig. 5;

Fig. 8 is a fragmentary sectional view taken along line 8—8 of Fig. 2;

Fig. 10 is an enlarged, fragmentary illustration of the pick-up pin actuating means incorporated in the reel of Fig. 1.

Figure 1:
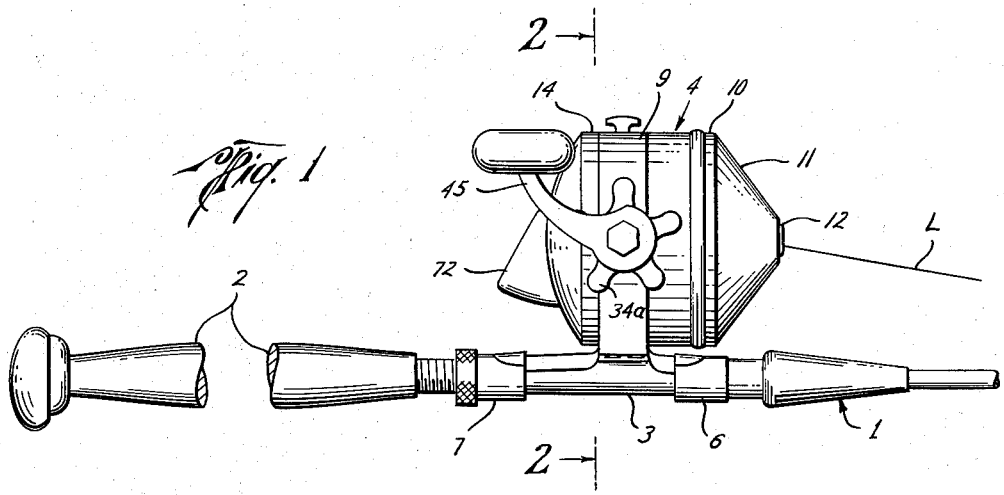
Fig. 1 is an elevational view of the reel in position on a fishing rod.

Referring to the drawing, the reference numeral 1 designates generally a fishing rod of any desired and generally conventional construction. This rod is provided with a handle portion 2 and is further provided with a reel seat 3. The reel, designated generally by the numeral 4, is mounted on a supporting plate 5 and is adapted to be secured to the reel seat of the handle, as shown. A ring-shaped keeper 6 is positioned at the forward end of the reel seat to slidably receive the forward end of supporting plate 5, while the opposite end of the latter is receivable in a thimble 7 threadedly mounted on the handle to be moved forwardly into clamping engagement with the rearward end of plate 5 and to be retracted therefrom in order to release the reel for removal from the rod.

Reel 4 comprises a tubular casing 9 formed of any suitable material, such as metal, rigid plastic, or the like, and is provided with a front cover 10 which fits snugly over the forward end of casing 9 and may be removed when desired. The forward portion of cover 10 is formed with a forwardly tapered conical portion 11 provided at its apex with a line guide opening 12 through which a line L may pass to and from the interior of the cover. A rear cover 14 fits snugly over the rear of the casing 9 and may be removed when desired. A wall 15 extends across the forward end of casing 9 and has formed in the center thereof a forwardly projecting tubular boss 16, having a bore 17. A line spool 18 is mounted on boss 16 and is arranged for controlled rotation about boss 16, as will be more fully described hereinafter. A pivoted keeper 16a serves to releasably lock the spool on boss 16.

Figure 9:
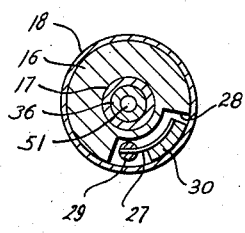
Fig. 9 is a fragmentary cross-sectional view taken along line 9—9 of Fig. 4.

A slipping clutch or drag mechanism is arranged between the outer periphery of boss 16 and the inner wall of spool 18 and comprises an arcuate resilient metal shoe 27 positioned in an arcuate groove 28 provided in the periphery of boss 16 (see Fig. 9 particularly), one end of the brake shoe being fixed to a brake lever 29 which extends longitudinally through boss 16 intermediate the inner and outer peripheries thereof and is rotatable therein. Oscillation of brake lever 29, the lever being secured to one end of the brake shoe, swings the free end of the brake shoe toward or away from the inner wall of spool 18 to correspondingly increase and decrease the frictional drag thereon. The free end of the brake shoe carries a friction pad 30 which may be constructed of any suitable friction-developing material, such as plastic, non-metallic composition materials, and the like. The rearward end of brake lever 29 projects through wall 15 to the rear thereof and is connected to a link 31 which is pivotally linked to a crosshead 32 which is threaded on a tubular adjusting rod 33 which projects through the wall of casing 9 to the exterior thereof, and is provided on its outer end with a star-shaped adjusting handle 34a. As best seen in Fig. 8, adjusting rod 33 is rotatably supported in a bearing 33a mounted in the wall of casing 9. By rotating handle 34a, crosshead 32 is caused to move back and forth along the threaded portion of rod 33 to thereby oscillate the brake lever, whereby to swing brake shoe 27 toward and away from the inner surface of spool 18 to thereby adjust the drag pressure on the spool. (See Fig. 9.)

Figure 3:
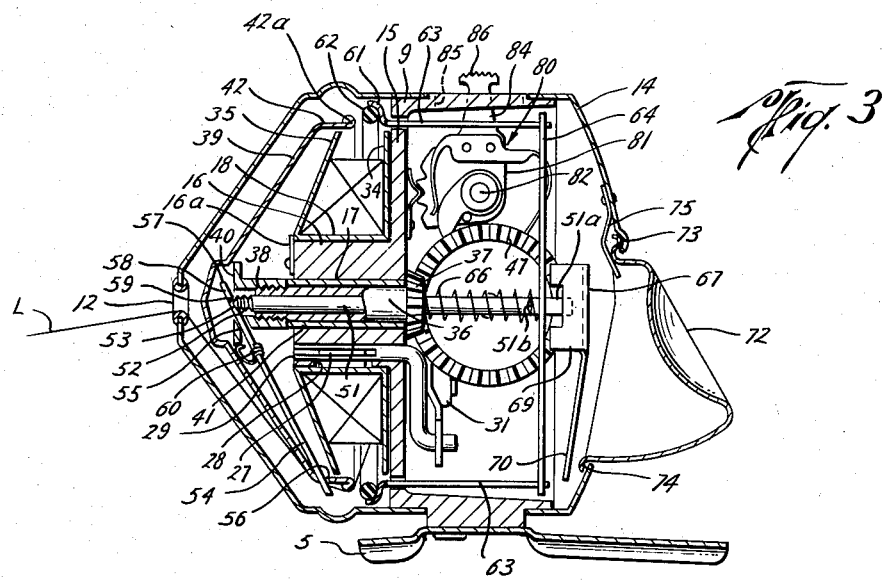
Fig. 3 is a longitudinal sectional view on line 3—3 of Fig. 2, showing the parts in positions occupied during re-winding.
Figure 4:
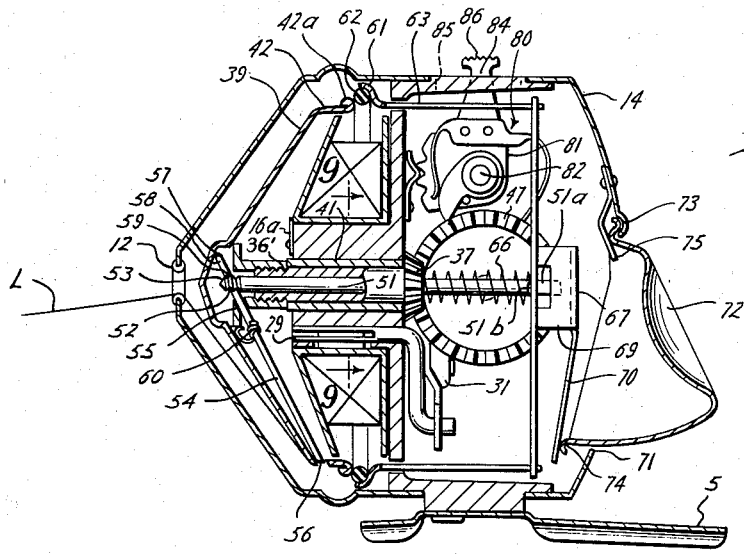
Fig. 4 is a view similar to Fig. 3, showing the parts in the positions occupied just prior to releasing the line for casting.

Line spool 18 is provided with a rear or inner end flange 34 which seats against the forward face of wall 15 and has a circular front flange 35 axially spaced from rear flange 34 and tapering outwardly and rearwardly toward the latter, thereby having the forwardly projecting, generally conic form, as shown. A tubular shaft 36 extends axially through bore 17 and is rotatable therein and carries on its inner or rearward end a bevel gear 37 which is fixedly secured on the shaft and bears against the rear face of wall 15. The forward or outer end of shaft 36 extends in front of the forward end of spool 18 and is provided with external threads 38 adapted to threadedly receive a generally circular pick-up head 39 of rearwardly tapered generally conical shape, substantially paralleling forward flange 35 of the line spool. Pick-up head 39 has fixed thereto a hollow central hub 40 which is internally threaded for threaded engagement with threads 38 to thereby secure the pick-up head to the shaft. A sleeve bearing 41 is disposed between shaft 36 and the wall of bore 17. Shaft 36 is provided with an external shoulder 36' forming a stop to limit the extent to which hub 40 will screw down over the end of shaft 36 to thereby provide a clearance space between pick-up head 39 and outer spool flange 35, as shown particularly in Figs. 3 and 4. The outer periphery of pick-up head 39 is formed with a rearwardly extending flange 42 which projects over and closely adjacent the outer periphery of spool flange 35, the inner edge of flange 42 being rounded, as at 42a. (Figs. 3 and 4.)

A crank shaft 43 (Fig. 8) extends through the bore of adjusting rod 33 to the exterior of casing 11, being rotatably journalled in rod 33 and in a supporting pillow block 44 mounted on the rear face of wall 15. A winding handle 45 is mounted on the outer end of the crank shaft and is secured thereto by means of a cap nut 46.

The inner end of crank shaft 43 has mounted thereon by a press-fit splined connection a bevel gear 47 which meshes with bevel gear 37, whereby rotation of crank shaft 43 will rotate shaft 36 and pick-up head 39. A sprocket 48 having teeth 49 is splined to and press-fit on shaft 43 in abutting relation to gear 47 so that both gear 47 and sprocket 48 are fixed against rotation on the shaft and relative to each other. A spacing and clamping plate 50 which is secured to the rearward end of pillow block 44 (Fig. 8) assures that bevel gear 47 and its associated parts are held to the left as seen in Fig. 8 so that gear 47 is always in meshing engagement with bevel gear 37.

A cylindrical rod 51 extends slidably through the bore of shaft 36 and through the center of bevel gear 37 and projects rearwardly therefrom. The forward end of rod 51 extends into the bore of hub 40, as best seen in Figs. 3 and 4, and is provided on its forward portion, just back of its forward end, with a short section of threads 52 of relatively coarse tapered form. The forward end of rod 51 is shaped to form a forwardly tapered conical surface 53. A line pick-up pin 54 is mounted for substantially radial movement on the inner face of head 39, extending through a passage 55 in hub 40 aligned with an opening 56 in flange 42. The inner end of pin 54 is reversely bent upon itself to form a hook-shaped portion 57, having a bill portion 58 which is positioned for engagement with the threaded end of rod 51. The end of bill portion 58 is cut at an angle to the longitudinal axis of the pin to form a cam surface 59, having a slope or taper which is generally complementary to the slope of surface 53. Cam surface 59, by reason of its sloping form, provides a relatively sharp point at its outer edge. Surface 53 and cam surface 59 and the pointed edge thereof, together with threads 52, comprise means for projecting and retracting the outer end of pin 54 with respect to flange 42. A coil spring 60 has one end secured to pin 54 and the other end to head 39 so as to normally urge pin 54 outwardly through opening 56. This form of pick-up means is substantially the same as that described in greater detail in my aforementioned co-pending application Serial No. 459,943, now Patent No. 2,915,258.

Longitudinal movement of rod 51 and rotary movement of head 39 are employed to actuate pick-up pin 54 in the following manner: With rod 51 retracted to the position shown particularly in Fig. 3, pin 54 will be thrust radially outwardly through opening 56 under the urging of spring 60 and will be in position to engage the line L for re-winding the same on the spool. In this position, it will be seen that cam surface 59 on bill portion 58 of the pick-up pin will be engaged by conical surface 53 on the forward end of rod 51. In order to retract pin 54, rod 51 will be moved forwardly, in a manner to be described hereinafter, whereby the relative tapers of surfaces 53 and 59 will co-act to pull pin 54 inwardly against the resistance of spring 60 and the forward movement of rod 51 will then advance the threads 52 past the end of bill portion 58, as best seen in Fig. 4, by a ratcheting action due to the yieldable mounting of pin 54. The point on the end of the bill portion will thus function as a pawl and will be engaged in the threads 52, as shown in Fig. 4. This will serve to hold the pick-up pin in the retracted position, allowing line L to move freely across flange 42 and the periphery of the pick-up head, as during casting. When it is again desired to project the pick-up pin to engage the line for re-winding, head 39 will be rotated in the re-winding direction. This will rotate the head and pin 54 around rod 51 and will act to unscrew bill portion 58 from its engagement with threads 52, and thereby urge rod 51 relatively rearwardly of the bill portion in response to this unthreading movement until bill portion 58 has been completely released from its engagement with rod 51, whereupon spring 60 will project the pin outwardly to the position shown in Fig. 3.

Figure 2:
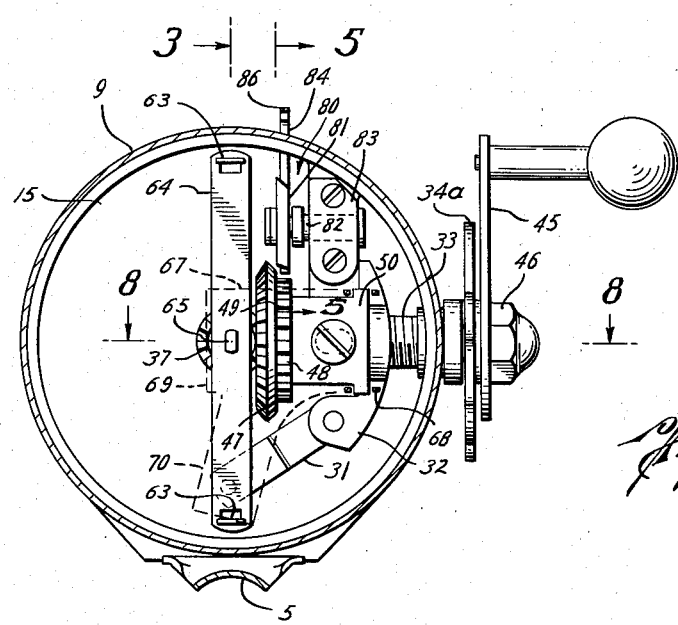
Fig. 2 is a transverse vertical cross-sectional view on line 2—2 of Fig. 1.

The reel includes a line control or brake mechanism of the general type disclosed in my U.S. Patent No. 2,675,192, and includes a ring-shaped brake member 61 mounted in front of wall 15 and provided on its forward face with a lining 62, composed of any suitable friction-creating material, such as rubber, plastic, or other composition material. Brake member 61 is radially and annularly dimensioned so that when moved forwardly it will annularly engage the rearward edge 42a of flange 42 and thereby clamp or brake the movements of line L passing to and from spool 18 (Fig. 4). A pair of diametrically spaced push rods 63—63 are secured to brake member 61 and project rearwardly through suitable openings in wall 15 and have their rearward ends secured to the opposite ends of a yoke 64 which extends diametrically of casing 9. The center of yoke 64 is provided with a rectangular opening 65 (Fig. 2) through which a flattened portion 51a forming the rearward end of rod 51 extends slidably rearwardly of yoke 64, whereby to hold rod 51 against rotation while permitting relative axial movement between the rod and the yoke. This relative axial movement is limited by a shoulder 51b defined at the inner end of flattened portion 51a, shoulder 51b forming an abutment which limits forward movement of yoke 64 axially along rod 51 and conversely limits rearward movement of rod 51 relative to yoke 64. A coil spring 66 is mounted about rod 51 in compression between bevel gear 37 and yoke 64 resiliently urging the latter and its connected brake member 61 rearwardly and, therefore, out of braking engagement with flange 42.

A pressure plate 67 is hingedly connected at one end to clamping plate 50 (Fig. 2), as by means of the hinge 68, and extends transversely of the reel casing to a point at the rear of the central portion of yoke 64. The free end of pressure plate 67 carries a forwardly extending projection 69 which bears against the rear face of yoke 64 and serves to space pressure plate 67 slightly rearwardly of the rearward end of rod 51 when the yoke is in the retracted position. An arm 70 (shown in broken line outline in Fig. 2 and in side edge elevation in Figs. 3 and 4) projects downwardly from pressure plate 67 and serves as a means for thrusting pressure plate 67 and projection 69 forwardly toward the yoke and the end of rod 51. Rear cover 14 has an opening 71 therein (Figs. 3 and 4) in which is mounted a thumb pressure plate 72 which is swingably connected at its upper end to the upper edge of opening 71, as by means of the hinge 73, so that it will swing freely through the opening in the cover. Plate 72 is formed to provide a forwardly projecting flange 74 which is disposed to bear against the rear face of arm 70 near its free end (Fig. 4) when the thumb pressure plate is urged forwardly by the thumb of the user. A leaf spring 75 is mounted in cover 14 to bear resiliently against the hinged upper portion of plate 72 in such fashion as to normally urge the pressure plate outwardly away from engagement with arm 70 (Fig. 3).

The spooling control unit comprising an assembly of parts designated generally by the numeral 80 (Figs. 2, 3 and 4) and shown in enlarged detail in Figs. 5 to 7, is mounted in the upper portion of casing 9 at one side of the center thereof and rearwardly of wall 15. The control unit includes the bell crank lever 81 pivotally mounted on a pivot pin 82 disposed above and parallel to crank shaft 43 and supported in a bracket 83 secured to the wall of casing 9. Bell crank lever 81 includes an arm 84 which projects upwardly and out of casing 9 through an elongated slot 85 extending longitudinally of the casing, the upper end of arm 84 terminating in a ribbed or knurled head 86 by which the operator's thumb or fingers may readily push the arm forwardly and rearwardly in slot 85. Bell crank lever 81 also includes a second arm 87 which is disposed substantially at right angles to arm 84 and extends forwardly toward wall 15. The forward edge of arm 87 carries a series of teeth 88 defining notches 89 therebetween, which cooperate with a spring pawl 90 mounted on the rear face of wall 15 to be in registration with the notched edge of arm 87. Spring pawl 90 is so positioned with respect to the notched edge of arm 87 that it may successively engage the notches as they are moved past the pawl by operation of arm 84. Engagement of the pawl in one notch will serve to hold the lever in the corresponding position until sufficient force is exerted on the lever to exceed the holding force of the spring pawl and thereby force the pawl out of that notch into the next one.

A ratchet pawl 91 is pivotally mounted on pivot pin 82 at one side of lever 81 in the plane of rotation of sprocket 48 and slightly spaced radially from the periphery thereof. A stop 92 mounted in the lower portion of arm 87 serves to limit movement of pawl 91 relative to arm 87 in the counterclockwise direction and to maintain pawl 91 out of engagement with sprocket teeth 49 when lever 81 is in the so-called "neutral" position, that is, when the center one of the notches 89 is engaged by spring pawl 90 and arm 84 is in the vertical position substantially in the center of slot 85, as best seen in Fig. 5. A strip of spring metal 93 is secured at about its mid-point to the outer face of lever 81 above pivot pin 82. The forward free end of strip 93 is turned downwardly and shaped to form a detent 94 which is extended to engage the back of pawl 91 to resiliently urge the latter toward stop 92. The opposite free end of strip 93 is likewise turned downwardly to form a springer finger 95 having a length such that when lever 81 is moved to its extreme rearward position, the end of finger 95 will resiliently engage sprocket teeth 49 (broken lines Fig. 6) and function as a click means to provide an audible signal indicating rotation of the pick-up head. The operation of the spooling control unit will be described in greater detail hereinafter.

The above-described reel operates in the following manner: It will be assumed that a re-winding operation has just been completed. At this stage, the part of the reel will be in the position as best seen in Fig. 3, in which it will be noted that bill portion 58 of the pick-up pin is riding on end surface 53 of rod 51, and the outer end of pick-up pin 54 is projecting through flange 42 into engagement with line L, and that brake member 61 and brake lever 64 are in their rearwardly retracted positions under the urging of spring 66. In this position, also, thumb pressure plate 72 will be in the normal relative outward position at which flange 74 will be out of contact with arm 70, all as shown in Fig. 3.

To prepare the reel for casting, the operator presses forward on thumb pressure plate 72. This forward movement of the thumb pressure plate causes flange 74 to press against arm 70, thereby applying pressure through pressure plate 67 and projection 69 against the rear face of yoke 64, which will thereby be urged forwardly into engagement with shoulder 51b on rod 51. The resulting application of forward pressure against rod 51 through shoulder 51b will urge rod 51 forwardly and thereby retract pick-up pin 54 and will cause bill portion 58 to engage threads 52, thereby locking the pick-up pin in a position out of engagement with line L, as shown in Fig. 4 and as previously described. At the same time, the forward pressure exerted against yoke 64 will advance brake member 61, with its lining 62, against the edge 42a of flange 42 and clamp line L therebetween, so as to hold the line against movement from the reel, although the pick-up pin has been retracted, as noted. Thereupon, as the cast is made, the thumb pressure will be relieved from thumb pressure plate 72, allowing yoke 64 to retract under the pressure of spring 66 and the natural resilience of yoke 64, pulling the brake member away from flange 42 and releasing line L which will unwind from spool 18 in response to the outward flight of the lure attached to the line. As the line flows from the spool, the operator may, by appropriate thumbing of thumb plate 72, move the brake member to braking engagement with the line as it passes over edge 42a of flange 40, thereby controlling the extent of the cast. Complete control may thereby be exercised by the operator over the movement of the line.

When it is desired to re-wind the line, handle 45 is turned in the forward direction which will ordinarily be the re-winding direction. The resulting rotation of shaft 43 will act through the gear train, formed by bevel gears 47 and 37, to rotate pick-up head 39 around rod 51. The rotation of head 39 will cause pick-up pin 54 to rotate therewith and the direction of rotation will be such that the end of bill portion 58 will be unscrewed from threads 52, rod 51 being thereby urged rearwardly sufficiently to release the engagement of bill portion 58 with the threaded end of the rod and allow the pick-up pin to be projected again into line-engaging position (Fig. 3). The pitch of threads 52 will ordinarily be so selected that a forward movement of handle 45 through only a part of a complete rotation, will be sufficient to release the pick-up pin for projection into the line pick-up position. Continued forword rotation of handle 45 will then serve to re-wind the line on spool 18. When the re-winding has been completed, the reel will be ready for another casting operation.

The drag brake, formed by brake shoe 27, may be adjusted through rotation of star handle 34a to apply the desired drag pressure on the line spool to provide the requisite degree of slippage under load, which will prevent breakage of the line.

Returning now to the spooling control unit, it may be noted that one of its primary functions is to prevent reverse rotation of the pick-up head as the line is being retrieved. As the form of reel herein described is adapted particularly for catching large fish, it will be evident that it is desirable when playing a large fish to be sure that as the line is rewound, it will not be lost to surges of the fish. Hence, it is desirable to prevent the pick-up head from turning in a direction which would release the line under the pull of the fish. To provide the anti-reverse lock, arm 84 is pushed to the forward position, shown in full lines in Fig. 6. In this position, the first notch 89 (considered in the counterclockwise direction from arm 84) will be engaged with spring pawl 90 and ratchet pawl 91 will be moved into engagement with sprocket teeth 49, re-winding direction of rotation of the sprocket being indicated by the arrow in Fig. 6. With ratchet pawl 91 thus engaged in sprocket teeth 49, the latter cannot turn in the opposite direction, detent 94 serving to maintain the pawl in engagement with the sprocket teeth. Hence, reverse rotation of the sprocket and the crank shaft to which the sprocket is non-rotatably fixed cannot occur. Rotation of sprocket 48 in the re-winding direction may continue freely as detent 94 will yield sufficiently to allow sprocket teeth 49 to pass under the end of ratchet pawl 91. Hence, the re-winding operation may be conducted readily while reverse rotation is effectively prevented. When the arm 84 is moved to the forward anti-reverse position, it will be noted that click finger 95 will be out of engagement with the sprocket teeth (solid lines Fig. 6).

During casting, lever 81 will ordinarily be moved to the neutral position, shown in full lines in Fig. 5. In this position, spring pawl 90 is engaged in the middle one of the three notches 89 to retain the lever in the neutral position, and ratchet pawl 91 as well as click finger 95 will be out of engagement with the sprocket teeth. In this position, the gear train connection handle 45 and pick-up head 39 may be rotated in either direction.

When it is desired to engage click finger 95 without otherwise effecting the movement of sprocket 48, lever 84 will be moved to its extreme rearward position, shown in broken lines in Fig. 6, in which position the third of the notches 89 will be engaged with spring pawl 90 and click finger 95 will be engaged with sprocket teeth 49. In this position, an audible noise will be provided to indicate rotation of spinner head 39 under pull by a fish and will ordinarily be set for that purpose.

It will be seen, therefore, that the spooling control unit comprises a single three-position lever which in its several positions functions as an anti-reverse lock, a spooling release, and as a click actuator.

It will be apparent from the foregoing description that the reel construction provides an efficient spinning reel adapted particularly for heavy duty service and having many advantages over more conventional types of spinning reels. While a preferred form of the invention has been shown and described, it will be understood, of course, that modifications therein, within the scope of the appended claims, may be made without departing from the spirit of this invention.

I claim:

1. In a fishing reel of the spinning type which includes a casing, a line-carrying spool in the casing, a line pick-up head rotatably mounted in the casing and having means associated therewith for engaging a line and winding it upon the spool when the pickup head is rotated, and a manually operable spooling control, the improvement in said spooling control characterized by said control comprising a bell crank pivotally mounted in said casing and having one end extending through an opening in the side wall of said casing for engagement by a user, a pawl mounted within said casing, ratchet means mounted within said casing for rotation with said pick-up head, means on said bell crank for moving said pawl into engagement with said ratchet means when said bell crank is pivoted in one direction, and click means operated by said bell crank and adapted for engagement with said ratchet means when said bell crank is pivoted in the other direction.

2. A fishing reel according to claim 1, in which a rotatable crank shaft is provided for rotating said pick-up head, said ratchet means comprises a sprocket carried by said crank shaft, said bell crank is pivoted on an axis aligned with the axis of said crank shaft, and said pawl and click means are carried by said bell crank.

3. A fishing reel according to claim 2, in which said pawl is pivoted on said bell crank for movement about the pivoting axis of said bell crank, stop means are carried by said bell crank for limiting pivotal movement of said pawl in one direction with respect to said bell crank, and spring means are carried by said bell crank and act upon said pawl to urge said pawl toward said stop means.

4. A fishing reel according to claim 3, in which said spring means comprises one leg of a U-shaped spring member, and said click means comprises the other leg of said spring member.

5. A fishing reel according to claim 1, in which said ratchet means comprises a sprocket rotatable about a fixed axis in accordance with rotational movement of said pickup head, said bell crank is mounted for pivotal movement about an axis parallel to the rotational axis of said sprocket, and said pawl and said click means are carried by said bell crank and extend therefrom toward said sprocket on opposite sides of said pivotal axis.

6. A fishing reel according to claim 5, in which cooperating detent means are provided on said bell crank and reel casing for retaining said bell crank selectively in any of three detent positions, said pawl is engaged with said ratchet means upon pivotal movement of said bell crank in one direction to a first detent position, said click means is engaged with said ratchet means upon pivotal movement of said bell crank in the other direction to a second detent position, and both said pawl and said click means are maintained out of engagement with said ratchet means when said bell crank is pivoted to a third detent position intermediate said limit positions.

7. In a fishing reel of the spinning type which includes a casing, a line-carrying spool in the casing, a line pick-up head rotatably mounted in the casing and having means associated therewith for engaging a line and winding it upon the spool when the pickup head is rotated, and a manually operable spooling control, the improvement characterized by said spooling control comprising pawl and ratchet means adapted when operative to prevent rotation of said pickup head in a line unwinding direction, said ratchet means comprising a sprocket rotatable in accordance with rotational movement of said pickup head, and said pawl means comprising a bell crank pivoted on said casing and having a portion projecting therefrom for manual engagement and a pawl pivoted on said bell crank and adapted upon pivotal movement of said bell crank to be moved into engagement with said sprocket, said bell crank having a plurality of operative positions, and detent means cooperatively associated with said bell crank for holding said bell crank in any of its operative positions, said pawl being in engagement with said sprocket in one operative position of said bell crank and disengaged from said sprocket in another operative position of said bell crank.

8. A fishing reel according to claim 7, in which said bell crank includes stop means for limiting pivotal movement of said pawl in one direction with respect to said bell crank and spring means for urging said pawl to pivot in said one direction.

(References on following page)

References Cited in the file of this patent

UNITED STATES PATENTS

| | | |
|---|---|---|
| 646,085 | Trabue | Mar. 27, 1900 |
| 2,668,025 | Hull | Feb. 2, 1954 |
| 2,705,113 | Bonanno | Mar. 29, 1955 |
| 2,777,645 | Wood | Jan. 15, 1957 |
| 2,783,001 | Grice | Feb. 26, 1957 |
| 2,828,927 | Yeada | Apr. 1, 1958 |
| 2,862,679 | Denison et al. | Dec. 2, 1958 |

FOREIGN PATENTS

| | | |
|---|---|---|
| 22,420 | Great Britain | 1912 |